United States Patent
Breuer et al.

[11] 3,839,329
[45] Oct. 1, 1974

[54] α-AMIDINOTHIOACETAMIDOCEPHALOSPORANIC ACID COMPOUNDS

[75] Inventors: Hermann Breuer, Burgweinting; Uwe D. Treuner, Regensburg, both of Germany

[73] Assignee: E. R. Squibb & Sons, Inc., Princeton, N.J.

[22] Filed: Nov. 4, 1971

[21] Appl. No.: 195,805

[52] U.S. Cl. .............................. 260/243 C, 424/246
[51] Int. Cl. ............................................. C07d 99/24
[58] Field of Search ................................. 260/243 C

[56] References Cited
UNITED STATES PATENTS

| | | | |
|---|---|---|---|
| 3,485,819 | 12/1969 | Weisenborn et al. | 260/243 C |
| 3,646,025 | 2/1972 | Crast | 260/243 C |
| 3,708,479 | 1/1973 | Welch et al. | 260/243 C |

*Primary Examiner*—Nicholas S. Rizzo
*Attorney, Agent, or Firm*—Lawrence S. Levinson; Merle J. Smith

[57] ABSTRACT

New α-amidinothioacetamidocephalosporanic acid compounds of the following general formula, and their salts,

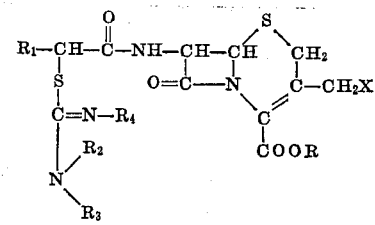

wherein R is hydrogen, lower alkyl, aralkyl, a salt forming ion or the group

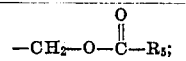

$R_1$ is lower alkyl, cyclo-lower alkyl, unsaturated cyclo-lower alkyl, aryl, aralkyl or a heterocyclic group; $R_2$ is hydrogen, lower alkyl or aryl; $R_3$ is hydrogen, lower alkyl, lower alkenyl, aryl, aralkyl, lower alkoxy-lower alkyl or certain heterocyclic radicals, or together $R_2$ and $R_3$ may form certain heterocyclic radicals; $R_4$ is hydrogen, lower alkyl, aryl or certain heterocyclic radicals; $R_5$ is lower alkyl, aryl or aralkyl and X is hydrogen, hydroxy, lower alkanoyloxy, aroyloxy, aralkanoyloxy, the radical of a nitrogen base, a quaternary ammonium radical or together X and R represent a bond linking carbon and oxygen in a lactone ring; are useful as antibacterial agents.

8 Claims, No Drawings

α-AMIDINOTHIOACETAMIDOCEPHALOSPORANIC ACID COMPOUNDS

SUMMARY OF THE INVENTION

This invention relates to new antibacterial α-amidino-thioacetamidocephalosporanic acid compounds of the formula

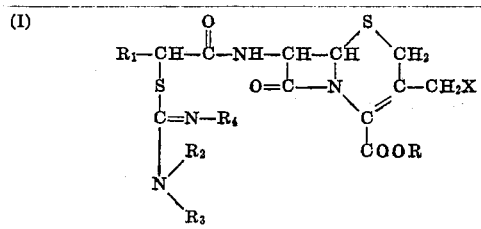

R represents hydrogen, lower alkyl, aralkyl, a salt forming ion or the group

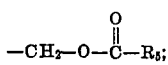

$R_1$ represents lower alkyl, cyclo-lower alkyl, unsaturated cycloalkyl, aryl, aralkyl or a heterocyclic group; $R_2$ represents hydrogen, lower alkyl or aryl; $R_3$ represents hydrogen, lower alkyl, lower alkenyl, aryl, aralkyl, lower alkoxy-lower alkyl or certain heterocyclic radicals or together $R_2$ and $R_3$ may form certain heterocyclic radicals; $R_4$ represents hydrogen, lower alkyl, aryl or certain heterocyclic radicals; $R_5$ represents lower alkyl, aryl or aralkyl; X is hydrogen, hydroxy, lower alkanoyloxy, aroyloxy, aralkanoyloxy, the radical of a nitrogen base or a quaternary ammonium radical. In addition X and R may represent a bond linking carbon and oxygen in a lactone ring.

The preferred members within each group are as follows: R is hydrogen, lower alkyl or alkali metal, especially hydrogen, methyl, pivaloyloxy, sodium or potassium; $R_1$ is phenyl, 1,4-cyclohexadienyl, pyridyl, pyrrolidyl, morpholino, thienyl, furyl, oxazolyl, isoxazolyl, thiazolyl, especially phenyl and most especially 1,4-cyclohexadienyl; $R_2$ and $R_3$ each is hydrogen or lower alkyl, especially methyl or ethyl; $R_4$ is hydrogen; $R_5$ is hydrogen or lower alkyl, preferably methyl or t-butyl. When $R_3$ is other than hydrogen or lower alkyl, $R_2$ is preferably hydrogen.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to eight carbons in the chain, for example, methyl, ethyl, propyl, isopropyl, butyl, isobutyl, t-butyl, amyl or the like. The lower alkenyl groups are monounsaturated hydrocarbon radicals of the same type, the two to four carbon members being preferred.

Cycloalkyl groups include cycloaliphatic groups having three to seven carbons in the ring such as cyclopropyl, cyclobutyl, cyclopentyl, cyclohexyl and cycloheptyl. The cyclic groups may also be cycloalkenyl and cycloalkadienyl groups of the same type, e.g., cyclobutenyl, cyclopentenyl, cyclohexenyl, cyclopentadienyl, cyclohexadienyl, etc. The double bond or bonds may be variously located. A particularly preferred radical, is the 1,4-cyclohexadienyl group. These may be simply substituted with one to three groups such as halogen, lower alkyl or lower alkoxy.

The aryl groups are monocyclic carbocyclic aryl groups including simply substituted members. By way of illustration, this includes the phenyl ring and simply substituted phenyl containing one to three substituents (preferably only one) such as the halogens (chlorine and bromine being preferred), lower alkyl groups such as those defined above, lower alkoxy groups, (i.e., lower alkyl groups of the type defined above attached to an oxygen), hydroxy, lower alkanoyl or lower alkanoyloxy. Illustrative are phenyl, o-, m- and p-chlorophenyl, o-, m- and p-bromophenyl, 3,4-dichlorophenyl, 3,5-dibromophenyl, o-, m- and p-tolyl, p-methoxyphenyl, 3,4,5-trimethoxyphenyl and p-hydroxyphenyl.

The aralkyl groups include a monocyclic carbocyclic aryl group attached to a lower alkyl group, both as defined above. Illustrative are benzyl, o-, m- or p-chlorobenzyl, o-, m- or p-bromobenzyl, o-, m- or p-methylbenzyl, phenethyl, p-chlorophenethyl, 3,5-diethylbenzyl, 3,4,5-trichlorobenzyl and the like.

The lower alkanoyloxy, aroyloxy and aralkanoyloxy groups represented by X include the acyl group of acid esters. The lower alkanoyl radicals are the acyl radicals of lower fatty acids containing alkyl radicals of the type described above. The lower alkanoyloxy groups include, for example, acetoxy, propionyloxy, butyryloxy and the like. The aroyloxy groups are derived from monocyclic carbocyclic aryl groups of the kind described. Similarly the aralkanoyloxy groups consist of monocyclic carbocyclic aryl and alkanoyloxy radicals of the type described. X also represents the radical of an amine, e.g., an alkylamine like methylamine, ethylamine, dimethylamine, triethylamine, aralkylamine like dibenzylamine, N,N'-dibenzylpyridinium, pyridinium, 1-quinolinium, 1-picolinium, etc. X and R may also join together, as indicated above to form a bond linking carbon and oxygen in a lactone ring.

The heterocyclic groups represented by $R_1$, $R_3$ and $R_4$ are pyridyl, pyrrolidyl, morpholinyl, thienyl, furyl, oxazolyl, isoxazolyl and thiazolyl as well as their simply substituted members wherein the simple substituents are the same as discussed above with respect to the aryl groups. The heterocyclic groups represented by the radical

(when $R_2$ and $R_3$ are joined) are saturated 5- to 6-membered monocyclic heterocyclic radicals (exclusive of hydrogen) containing nitrogen, sulfur or oxygen in the ring in addition to carbon (not more than two hetero atoms), and members of this group simply substituted as discussed above with respect to the aryl groups. The heterocyclic radicals include, for example, piperidino, pyrrolidino, morpholino and piperazino as well as the simply substituted members especially the halo, lower alkyl (particularly methyl and ethyl), lower alkoxy (particularly methoxy and ethoxy), phenyl and hydroxy-lower alkyl (particularly hydroxymethyl and hydroxyethyl) substituted members.

The salt forming ions may be metal ions, e.g., aluminum, alkali metal ions such as sodium or potassium, alkaline earth metal ions such as calcium or magnesium, or an amine salt ion, of which a number are known for this purpose, for example, dibenzylamine, N,N-dibenzylethylenediamine, methylamine, triethylamine, procaine, N-ethylpiperidine, etc.

Preferred groups of compounds are those having the formulas

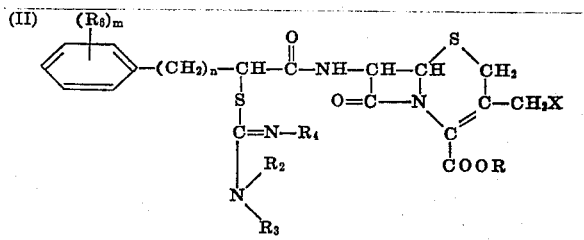

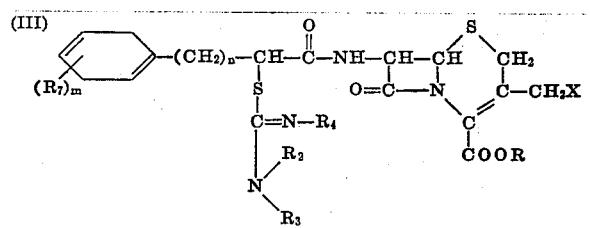

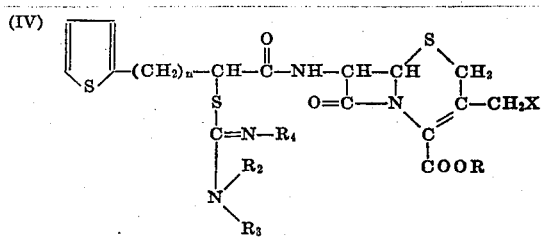

R and X have the same meaning described above but especially X is hydrogen or acetoxy, and R is hydrogen or sodium.

$R_6$ is hydrogen or a hydroxy, halogen, lower alkyl, lower alkoxy, lower alkanoyl or lower alkanoyloxy group such as those described above. $R_7$ is hydrogen, lower alkyl or lower alkoxy. $m$ is 1, 2 or 3 and $n$ is 0, 1, 2, 3 or 4. Most preferred are those compounds wherein $R_6$ and $R_7$ each is hydrogen, especially when $n$ is 0. $R_2$, $R_3$ and $R_4$ are hydrogen or lower alkyl.

The compounds of formula I are produced by first forming a compound of the formula

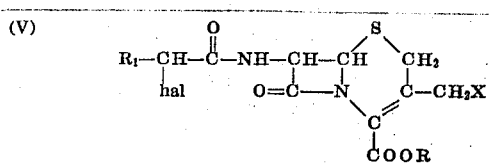

wherein hal represents one of the halogens chlorine, bromine or iodine, preferably bromine and then treating the compound of formula V with an unsubstituted or substituted thiourea of the following formula:

(VI) 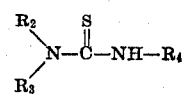

in the presence of or followed by treatment with a nitrogen base like triethylamine.

The compound of formula V is dissolved in an organic solvent at about room temperature and the compound of formula VI is slowly added. Suitable solvents include, for example, methanol, ethanol, acetonitrile, dimethylformamide, methylene chloride, chloroform and the like. After a suitable period to allow the reaction to come to completion, the nitrogen base is added, then the product may be worked up by conventional techniques.

As an alternative, an acid of the following formula (derived by reacting the acid $R_1$—$CH_2$—COOH with a thiourea of formula VI).

(VII) 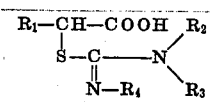

wherein $R_1$, $R_2$, $R_3$ and $R_4$ each has the meaning described above, is converted to one of its known activated acid derivatives and then reacted with a 7-aminocephalosporanic acid compound of the formula (VIII) 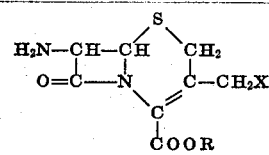

When R is the acyloxymethyl group

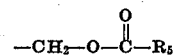

this group may be introduced onto the 7-aminocephalosporanic acid moiety either prior to or subsequent to the reaction with the compound of formula VI or VIII by treatment with one to two moles of a halomethyl ester of the formula hal—$CH_2OCOR_4$ (IX)

wherein hal is halogen, preferably chlorine or bromine, in an inert organic solvent such as dimethylformamide, acetone, dioxane, benzene or the like at about ambient temperature or below.

The products of this invention form salts which are also part of the invention. Basic salts form with the acid moiety as discussed above when the symbol R is hydrogen.

Further process details are provided in the illustrative examples.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to cephalothin and other cephalosporins. For example, a compound of formula I or a physiologically acceptable salt thereof may be used in various animal species in an amount of about 1 to 200 mg./kg., daily, orally or parenterally, in single or two to four divided doses to treat infections of bacterial origin, e.g., 5.0 mg./kg. in mice.

Up to about 600 mg. of a compound of formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.1 to 1 percent by weight of such compounds admixed with, suspended or dissolved in conventional inert dry or aqueous carriers for application by washing or spraying.

They are also useful as nutritional supplements in animal feeds.

The following examples are illustrative of the invention. All temperatures are on the centigrade scale. Additional variations may be produced in the same manner by appropriate substitution in the starting material.

EXAMPLE 1

7-[2-(amidinothio)-2-phenylacetamido]cephalosporanic acid 2.34 g. (0.005 mol.) of 7-($\alpha$-bromophenylacetamido)cephalosporanic acid are dissolved in 15 ml. of dimethylformamide. The solution is cooled to $-20°$ and a solution of 0.38 g. (0.005 mol.) of thiourea in 5 ml. of dimethylformamide are added dropwise over 10 minutes. This is stirred for 20 minutes more at $-20°$ and then 1 ml. of triethylamine is added. The mixture is poured into 300 ml. of ether. A viscous, non-crystalline precipitate forms from which the ether is decanted. The residue is treated with 30 ml. of ethanol. The insoluble portion is separated by filtration. The product is precipitated from the filtrate by the addition of ether. The yield amounts to 1.1 g. of 7-[2-(amidinothio)-2-phenylacetamido]cephalosporanic acid, m.p. 122°–125° (dec.).

EXAMPLE 2

7-[2-(methylamidinothio)-2-phenylacetamido]cephalosporanic acid 2.34 g. of 7-($\alpha$-bromophenylacetamido)cephalosporanic acid and 0.45 g. of methylthiourea are reacted for 2 hours at $-20°$ according to the procedure of Example 1 to obtain 1.6 g. of 7-[2-(methylamidinothio)-2-phenylacetamido]cephalosporanic acid.

EXAMPLE 3

7-[2-(allylamidinothio)-2-phenylacetamido]cephalosporanic acid

By utilizing the procedure of Example 1, 2.34 g. of 7-($\alpha$-bromophenylacetamido)cephalosporanic acid and 0.58 g. of allylthiourea yield 1.7 g. of 7-[2-(allylamidinothio)-2-phenylacetamido]cephalosporanic acid.

The following additional products having the formula B of the table are obtained according to the procedure of Example 1 by substituting for the ($\alpha$-bromophenylacetamido)cephalosporanic acid the 7-$\alpha$-bromoacetylaminocephalosporanic acid compound having $R_1$ indicated in Formula B and utilizing instead of thiourea the thiourea of formula A with the substituents $R_2$, $R_3$ and $R_4$ indicated in the table:

TABLE

Formula (A): $R_3R_2N-C(=S)-NH-R_4$, with $-O-R$

Formula (B): $R_1-CH-CO-NH-CH-CH-S-CH_2-C(=...)-C(-OR)(=O)-CH_2X$ containing $C=N-R_4$ and $N-C(-S-)$ with $R_2, R_3$

| Example | (A) $R_2$ | $R_3$ | $R_4$ | R | (B) $R_1$ | $R_2$ | $R_3$ | $R_4$ | X |
|---|---|---|---|---|---|---|---|---|---|
| 4 | $CH_3$ | $CH_3$ | $CH_3$ | $CH_3$ | $C_6H_5$ | $CH_3$ | $CH_3$ | $CH_3$ | H |
| 5 | $C_2H_5$ | H | H | $C_2H_5$ | $CH_3$ | $C_2H_5$ | H | H | OH |
| 6 | $C_2H_5$ | $C_6H_5$ | $C_6H_5$ | $CH_3$ | $C_3H_7$ | $C_2H_5$ | $C_6H_5$ | $C_6H_5$ | Pyridinium |
| 7 | $CH_3$ | $C_6H_5CH_2-$ | H | $C_6H_5CH_2-$ | $C_6H_5CH_2-$ | $CH_3$ | $C_6H_5CH_2-$ | H | $OCOCH_3$ |
| 8 | H | H | H | $-CH_2OC(O)-CH(CH_3)_2$ | $4-ClC_6H_4$ | H | H | H | $OCOCH_3$ F. 622 |
| 9 | $C_2H_5$ | $C_2H_5$ | H | $-CH_2OC(O)-C_6H_5$ | $3,4-(CH_3O)_2C_6H_3-$ | $C_2H_5$ | $C_2H_5$ | H | H |
| 10 | $C_2H_5$ | $C_2H_5$ | H | | $3,4,5-(CH_3O)_3C_6H_2-$ | $C_2H_5$ | $C_2H_5$ | H | $OCOCH_3$ |
| PAT. NO. 3839329 | | | | | | | | | |
| 11 | H | H | (thienyl) | H | $4-CH_3C_6H_4-$ | H | H | (thienyl) | $OCOCH_3$ |
| 12 | H | H | H | Lactone (+X) | $3,4-(Br)_2C_6H_3CH_2-$ | H | H | H | Lactone (+R) |
| 13 | $C_2H_5$ | H | H | $C_2H_5$ | $2,4-(Cl)_2C_6H_3-$ | $CH_3$ | H | H | $OCOCH_3$ |
| 14 | $C_2H_5$ | $C_2H_5$ | H | $C_2H_5$ | $C_6H_5-$(isoxazolyl-CH_3) | $C_2H_5$ | $C_2H_5$ | H | $OCOCH_3$ |
| 15 | $C_2H_5$ | $C_2H_5$ | H | $C_2H_5$ | (morpholinyl) | $C_2H_5$ | $C_2H_5$ | H | $OCOCH_3$ |
| 16 | $C_2H_5$ | $C_2H_5$ | (pyridyl) | $C_2H_5$ | (methylpyridyl) | $C_2H_5$ | $C_2H_5$ | H | $OCOCH_3$ |
| 17 | $C_2H_5$ | $C_2H_5$ | H | $C_2H_5$ | (thienyl) | $C_2H_5$ | $C_2H_5$ | H | $OCOCH_3$ |
| 18 | H | $C_6H_5CH_2-$ | H | $C_6H_5CH_2-$ | (furyl) | H | $C_6H_5CH_2-$ | (pyridyl) | $-OOCH_2C_2H_5$ |

TABLE — Continued $$R_1-CH-CO-NH-CH-CH-CH_2$$
$$\quad\quad\quad\quad\quad\quad\quad | \quad\quad | \quad\quad |$$
$$\quad\quad\quad\quad\quad\quad\quad S \quad\quad\; \; \;\;\; CH_2$$
$$\quad\quad\quad\quad\quad\;\; | \quad\quad\quad\quad\quad |$$
$$\quad\quad\quad\quad\;\; O=C\;\;\;\;\;-N\;\;\;\;\;-C-CH_2X$$
$$\quad\quad\quad\quad\quad\quad\;\;\;\;\;\;\;\;\;\;\;\;\;\;\;\;\;\;\;\;\;\; C-O-R$$
$$\quad\quad\quad\quad\quad\quad\quad\quad\quad\quad\quad\quad\quad\quad\quad\quad\quad\;\;\;\; \|$$
$$\quad\quad\quad\quad\quad\quad\quad\quad\quad\quad\quad\quad\quad\quad\quad\quad\quad\;\;\;\; O$$

$$\quad\quad\;\; R_3 \quad\; S$$
$$\quad\quad\quad\;\; \backslash \quad\; \|$$
$$\quad\quad\quad\quad N-C-NH-R_4$$
$$\quad\quad\;\; / $$
$$\quad\quad R_2$$

$$R_1-CH-CO-NH-...$$
$$\quad\quad\;\; | $$
$$\quad\quad\;\; S$$
$$\quad\quad\;\; |$$
$$\quad\quad\;\; C=N-R_4$$
$$\quad\quad / $$
$$\quad\;\; N$$
$$\;\; / \;\; \backslash$$
$$R_2 \quad\; R_3$$

(A) / (B)

| Example | R$_2$ | R$_3$ | R$_4$ | R | R$_1$ | R$_2$ | R$_3$ | R$_4$ | X |
|---|---|---|---|---|---|---|---|---|---|
| 19 | H | C$_6$H$_5$CH$_2$— | H | —CH$_2$OC(=O)—CH(CH$_3$)$_2$ | CH$_3$— | H | C$_6$H$_5$CH$_2$— | H | H |
| 20 | H | C$_6$H$_5$ | C$_6$H$_5$ | —CH$_2$OC(=O)—CH(CH$_3$)$_2$ | C$_6$H$_5$— | H | C$_6$H$_5$ | C$_6$H$_5$ | —OOC—C$_6$H$_5$ |
| 21 | H | C$_2$H$_5$ | H | H |  | H | C$_2$H$_5$ | H | H |
| 22 | H | C$_6$H$_5$ | H | Na | 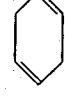 | H | C$_6$H$_5$ | H | —OCOCH$_3$ |
| 23 | CH$_3$ | CH$_3$ | H | —CH$_2$OC(=O)—CH(CH$_3$)$_2$ | C$_6$H$_5$ | CH$_3$ | CH$_3$ | H | H |
| 24 | H | —CH$_2$CH=CH$_2$ | H | H |  | H | —CH$_2$CH=CH$_2$ | H | —OCOCH$_3$ |
| 25 | H | —CH$_2$OCH$_3$ | H | Na | C$_6$H$_5$— | H | —CH$_2$OCH$_3$ | H | H |
| 26 | H | —CH$_2$CH$_2$OC$_2$H$_5$ | H | Na | C$_6$H$_5$— | H | —CH$_2$CH$_2$OC$_2$H$_5$ | H | H |
| 27 | H | H | H | H |  | H | H | H | H |
| 28 | H | H | H | H |  | H | H | H | H |
| 29 | H | H | H | H | 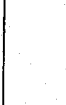 | H | H | H | H |
| 30 | H |  | H | H | C$_6$H$_5$CH$_2$ | H |  | H | H |
| 31 | H |  | H | H | C$_6$H$_5$CH$_2$ | H |  | H | H |
| 32 | H |  | H | H | C$_6$H$_5$ | H |  | H | H |
| 33 | H | H | H | H | 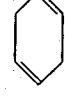 | H | H | H | H |

What is claimed is:
1. A compound of the formula

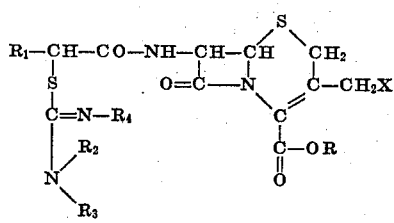

wherein R is hydrogen, lower alkyl, alkali metal or

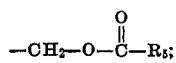

$R_1$ is lower alkyl, phenyl, cyclohexadienyl, thienyl or furyl; $R_2$ and $R_4$ each is hydrogen, lower alkyl or phenyl; $R_3$ is hydrogen, lower alkyl, lower alkenyl or phenyl; $R_5$ is lower alkyl, phenyl or phenyl-lower alkyl; and X is hydrogen or lower alkanoyloxy.

2. A compound as in claim 1 wherein $R_1$ is 1,4-cyclohexadienyl and $R_2$, $R_3$, $R_4$ and X each is hydrogen.

3. A compound of the formula

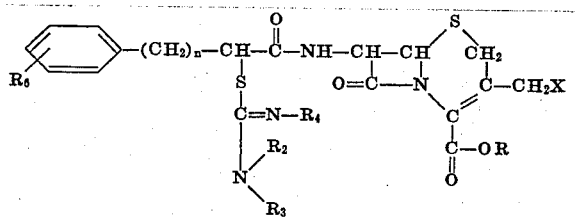

wherein R is hydrogen or alkali metal; $R_2$ and $R_4$ each is hydrogen or lower alkyl; $R_3$ is hydrogen, lower alkyl or lower alkenyl; $R_6$ is hydrogen, lower alkyl or lower alkoxy; X is hydrogen or acetoxy; and n is 0 to 4.

4. A compound of the formula

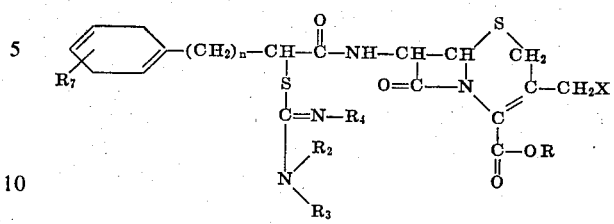

wherein R, $R_2$, $R_3$, $R_4$, X and n have the same meaning as in claim 3, and $R_7$ is hydrogen, lower alkyl or lower alkoxy.

5. A compound of the formula

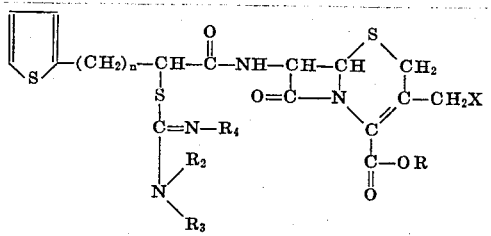

wherein R, $R_2$, $R_3$, $R_4$, X and n have the same meaning as in claim 3.

6. A compound as in claim 3 wherein R, $R_2$, $R_3$, $R_4$ and $R_6$ each is hydrogen, X is acetoxy and n is 0.

7. A compound as in claim 3 wherein R, $R_3$, $R_4$ and $R_6$ each is hydrogen, $R_2$ is methyl, X is acetoxy and n is 0.

8. A compound as in claim 3 wherein R, $R_2$, $R_4$ and $R_6$ each is hydrogen, $R_3$ is allyl, X is acetoxy and n is 0.

* * * * *